US007403692B2

(12) United States Patent
Son (10) Patent No.: US 7,403,692 B2
(45) Date of Patent: Jul. 22, 2008

(54) APPARATUS AND METHOD FOR MANAGING DATA

(75) Inventor: Hyun-Su Son, Chilgok-Gun (KR)

(73) Assignee: LG Electronics Inc., Seoul (KR)

( * ) Notice: Subject to any disclaimer, the term of this patent is extended or adjusted under 35 U.S.C. 154(b) by 965 days.

(21) Appl. No.: 10/438,001

(22) Filed: May 15, 2003

(65) Prior Publication Data
US 2003/0231859 A1 Dec. 18, 2003

(30) Foreign Application Priority Data
Jun. 3, 2002 (KR) .................. 10-2002-0031080

(51) Int. Cl.
H04N 5/76 (2006.01)
H04N 5/761 (2006.01)
(52) U.S. Cl. .................. 386/83; 386/94; 386/95; 386/124
(58) Field of Classification Search .......... 386/83, 386/94, 124–126; 725/39, 58, 61
See application file for complete search history.

(56) References Cited

U.S. PATENT DOCUMENTS

| 4,885,775 | A | * | 12/1989 | Lucas | 380/234 |
| 5,758,259 | A | * | 5/1998 | Lawler | 725/45 |
| 6,172,674 | B1 | * | 1/2001 | Etheredge | 715/721 |
| 6,177,931 | B1 | * | 1/2001 | Alexander et al. | 725/52 |
| 6,324,338 | B1 | * | 11/2001 | Wood et al. | 386/83 |
| 6,614,987 | B1 | * | 9/2003 | Ismail et al. | 386/83 |
| 6,732,367 | B1 | * | 5/2004 | Ellis et al. | 725/27 |
| 6,772,147 | B2 | * | 8/2004 | Wang | 707/3 |

(Continued)

FOREIGN PATENT DOCUMENTS

CA 2091501 A1 * 9/1994

(Continued)

OTHER PUBLICATIONS

Mann, S., and Mitchell, E. L. _Linux System Security: The Administrator's Guide to Open Source Security Tools_. Upper Saddle River, NJ, Prentice Hall, 2000. pp. 67-68. QA76.76.O63.*

(Continued)

*Primary Examiner*—Mehrdad Dastouri
*Assistant Examiner*—David N Werner
(74) *Attorney, Agent, or Firm*—Birch, Stewart, Kolasch & Birch, LLP (57) ABSTRACT

An apparatus and a method for managing data stored in a personal video recorder (PVR) allows multiple users to utilize the PVR and to individually set protection levels for programs (e.g. movies, music) stored on the PVR. The protection levels permit a user to specify whether or not a recorded program is playable by others, may be overwritten by others, or even will be visible on a menu listing the programs stored on the PVR. A user may also select a period of time, within which the recorded program will be write protected. Each user will have a unique user ID, which may include a password. Further, the user ID will allow the system to associate certain preset limitations to the specific user. For example, a user may only be able to view programming recorded on the PVR having a restriction rating below a preset threshold (e.g. PG-13).

43 Claims, 4 Drawing Sheets

U.S. PATENT DOCUMENTS

| | | | |
|---|---|---|---|
| 6,775,461 B2 * | 8/2004 | Poslinski et al. | 386/46 |
| 6,920,278 B1 * | 7/2005 | Yano et al. | 386/94 |
| 6,920,281 B1 * | 7/2005 | Agnibotri et al. | 386/125 |
| 6,922,843 B1 * | 7/2005 | Herrington et al. | 725/30 |
| 2002/0038358 A1 * | 3/2002 | Sweatt et al. | 709/218 |
| 2003/0007782 A1 * | 1/2003 | Kamen | 386/83 |
| 2003/0014750 A1 * | 1/2003 | Kamen | 725/25 |
| 2003/0108328 A1 * | 6/2003 | Kawasaki et al. | 386/46 |
| 2003/0163811 A1 * | 8/2003 | Luehrs | 725/25 |

FOREIGN PATENT DOCUMENTS

| | | |
|---|---|---|
| CN | 1172397 A | 2/1998 |
| JP | 2000270276 A * | 9/2000 |

OTHER PUBLICATIONS

Petreley, N. "Invisible Linux". The Penguin Brief [online], [Aug. 11, 2000] [retrieved on Feb. 21, 2007]. Retrieved from the Internet: <URL:http://www.itworld.com/Open/4877/lw-08-penguin_2/pfindex.html>.*

* cited by examiner

FIG.4

APPARATUS AND METHOD FOR MANAGING DATA

This nonprovisional application claims priority under 35 U.S.C. § 119(a) on Patent Application No(s). 2002-0031080 filed in KOREA on Jun. 3, 2002, which is(are) herein incorporated by reference.

BACKGROUND OF THE INVENTION

1. Field of the Invention

The present invention relates to a personal video recorder (PVR). More particularly, the present invention concerns an apparatus and a method for managing data stored in a PVR.

2. Description of the Background Art

PVRs are growing in popularity. A PVR may be integrated into a television, but more typically, the PVR is provided in a dedicated set top box, such as a cable signal decoder box or a satellite signal decoder box. The PVR allows a person to record programming. Usually, the programming is recorded in a digital format on a hard drive within the PVR. However, it is envisioned that a PVR could also record in formats other than digital (e.g. an analog format) and/or could employ other memory devices than a hard drive (e.g. a rewriteable optical drive or a RAM).

In a well-know manner, the PVR can be used to pause a currently broadcast program to record a desired program while simultaneously viewing another program, and can be set to record a future program. Also, a PVR can be used to stored video conferences for business purposes, and to store music (e.g. to record a compilation of music or songs from a connected compact disc player).

The PVRs of the background art have memories which can store approximately eighty hours of standard definition video programming. Of course, PVR technology is improving and one of the improvements involves an increased memory size, so that more programs can be stored on the PVR and/or high definition programs can be stored (e.g. HDTV).

The PVRs of the background art have a menu or listing which lists the titles of the programs stored in the memory. The menus may also list some additional information which was received along with the broadcast signal at the time of recording (e.g. genre information, recording time, original air date and time).

With potentially eighty or more hours of programming stored on a PVR, and with potentially several users (e.g. family members, roommates) utilizing a PVR, there is a need for an improved organization menu to access the programming data and/or to associate control over the stored programs with certain users. Further, there is a need for an organization menu which will allow viewing restrictions to be imposed on younger viewers. Further, there is a need for an organization menu which will allow better user settable controls concerning such parameters as an overwriting ability of the PVR relative to certain stored programs.

For example, the PVRs of the background art allow stored programs to be overwritten at the discretion of the present user. This can lead to problems. Sometimes the present user will overwrite a stored program of another user, without the permission of the other user. For instances, a child might overwrite a news broadcast stored by a parent, before the parent had the chance to view the stored news broadcast.

An example of another drawback occurs when an adult user stores programming with adult content on the PVR (e.g. an R rated movie). The PVR menus of the background art make no provision to limit the viewing of such programs by younger users of the PVR. Further, the PVR menus of the background art make no provision to hide the titles of such programs in the menu or listing of programs stored on the PVR.

SUMMARY OF THE INVENTION

Therefore, an object of the present invention is to provide an apparatus and a method to address one or more of the drawbacks associated with the background art.

These and other objects are accomplished by providing an apparatus and a method for managing data stored in a personal video recorder (PVR) allowing multiple users to utilize the PVR and to individually set protection levels for programs (e.g. movies, music) stored on the PVR. The protection levels permit a user to specify whether or not a recorded program is playable by others, may be overwritten by others, or even will be visible on a menu listing the programs stored on the PVR. A user may also select a period of time, within which the recorded program will be write protected. Each user will have a unique user ID, which may include a password. Further, the user ID will allow the system to associate certain preset limitations to the specific user. For example, a user may only be able to view programming recorded on the PVR having a restriction rating below a preset threshold (e.g. PG-13).

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
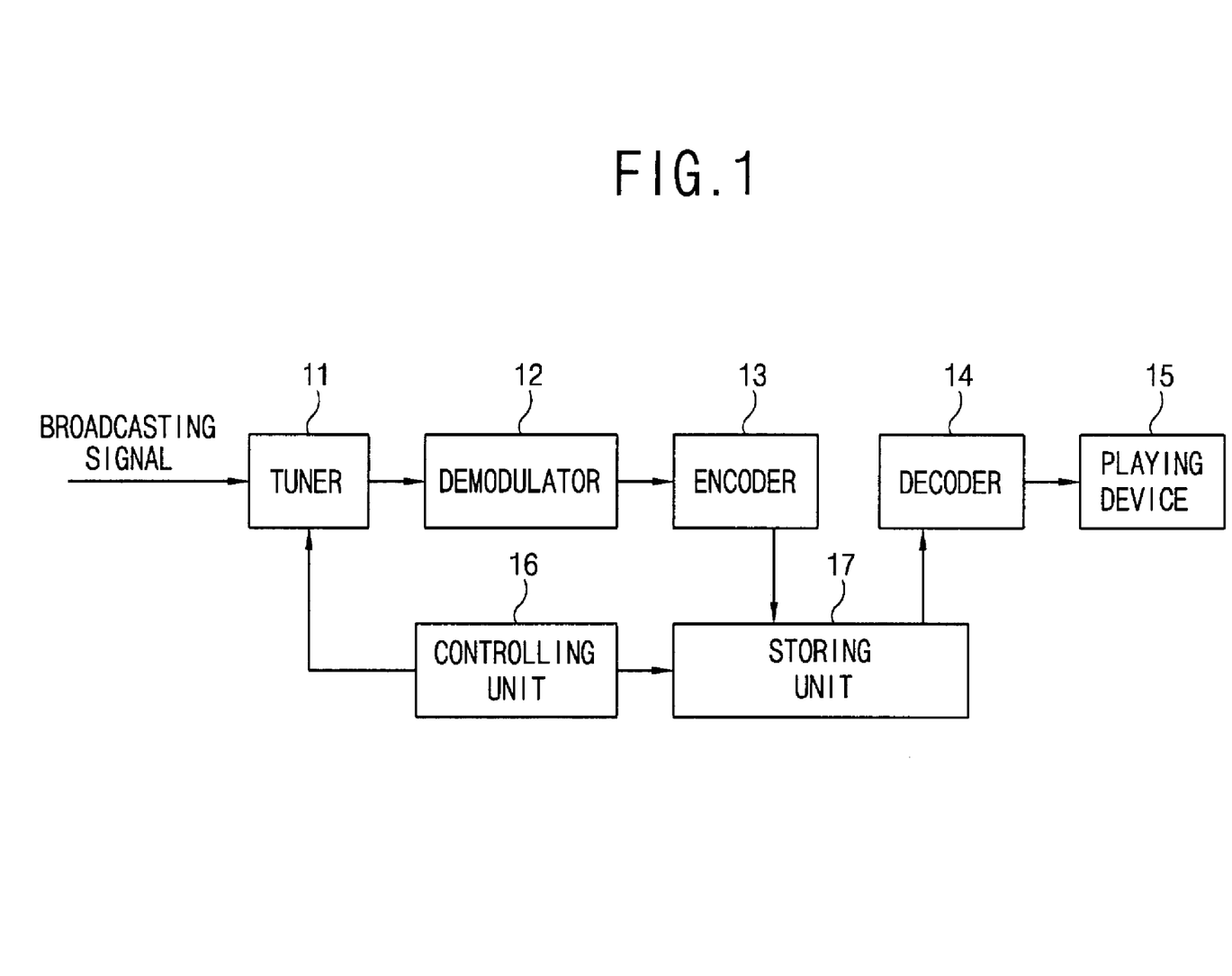
FIG. 1 is a block diagram showing an apparatus for managing data in a PVR, according to an embodiment of the present invention.

FIG. 1 is a block diagram showing an apparatus for managing data in the PVR system, according to an embodiment of the present invention. The apparatus includes a tuner 11 for tuning a broadcasting signal of a channel selected by a user among broadcasting signals of a plurality of channels.

A demodulator 12 receives the broadcasting signal from the tuner 11 and converts it into a transport stream after demodulating the signal to correct any errors. Afterwards, the transport stream is encoded by an encoder 13. The encoded transport stream is stored in a storing unit 17, along with associated programming information (e.g. a rating restriction, genre, title, plot summary, principal actors and actresses, original air date, etc.), and user information (as will be more fully explained below). The storing unit 17 may be physically incorporated into a housing of the PVR, or located in a remote Internet server connected to the PVR.

A decoder 14 receives an output of the storing unit 17 and extracts a video signal and an audio signal corresponding to the program selected by the user. An output of the decoder 14 is provided to a playing device 15, such as a television or computer. A controlling unit 16 receives user inputs and controls the tuner 11 to select the broadcasting signal of the channel wanted by the user. The controlling unit 16 also controls playing of the broadcasting programs stored in the storing unit 17 based on user information (as will be more fully explained below).

Hereinafter, operations of the apparatus for managing data in the PVR system according to the present invention will be described in more detail. First, the demodulator 12 converts the digital broadcasting signal corresponding to the channel selected by the user into the transport stream, and outputs the converted transport stream to the encoder 13.

The encoder 13 encodes the transport stream outputted from the demodulator 12, and outputs the encoded transport stream to the storing unit 17. The storing unit 17 stores the encoded transport stream, recording list, user information, rating restriction information and various other data according to a controlling signal of the controlling unit 16. The storing unit 16 outputs the stored information into the decoder 14 according to the controlling signals of the controlling unit 16.

The decoder 14 extracts the video signal and the audio signal from the encoded transport stream stored in the storing unit 17 based on the controlling signal of the controlling unit 16. The decoder 14 outputs the extracted video signal and the audio signal to the playing device 15.

During operation, the controlling unit 16 requires a user to input user ID information prior to accessing a program recording/playback menu of the PVR system. The user ID information would include at least one of a user name and user password, which would be compared to preset user names and/or passwords stored in the PVR, such as in the storing unit 17. After that, the controlling unit 16 causes the PVR to display a menu of the recording list of programs stored in the storing unit 17 of the PVR.

Although the above description has focused on the storing of video-audio programs, it should be appreciated that the term program has a broad context. Programs would include music only programs. Further, the present invention could be used to control a PVR in storing programs in the form of documents, such as WordPerfect documents, and various other types of data.

Figure 2:
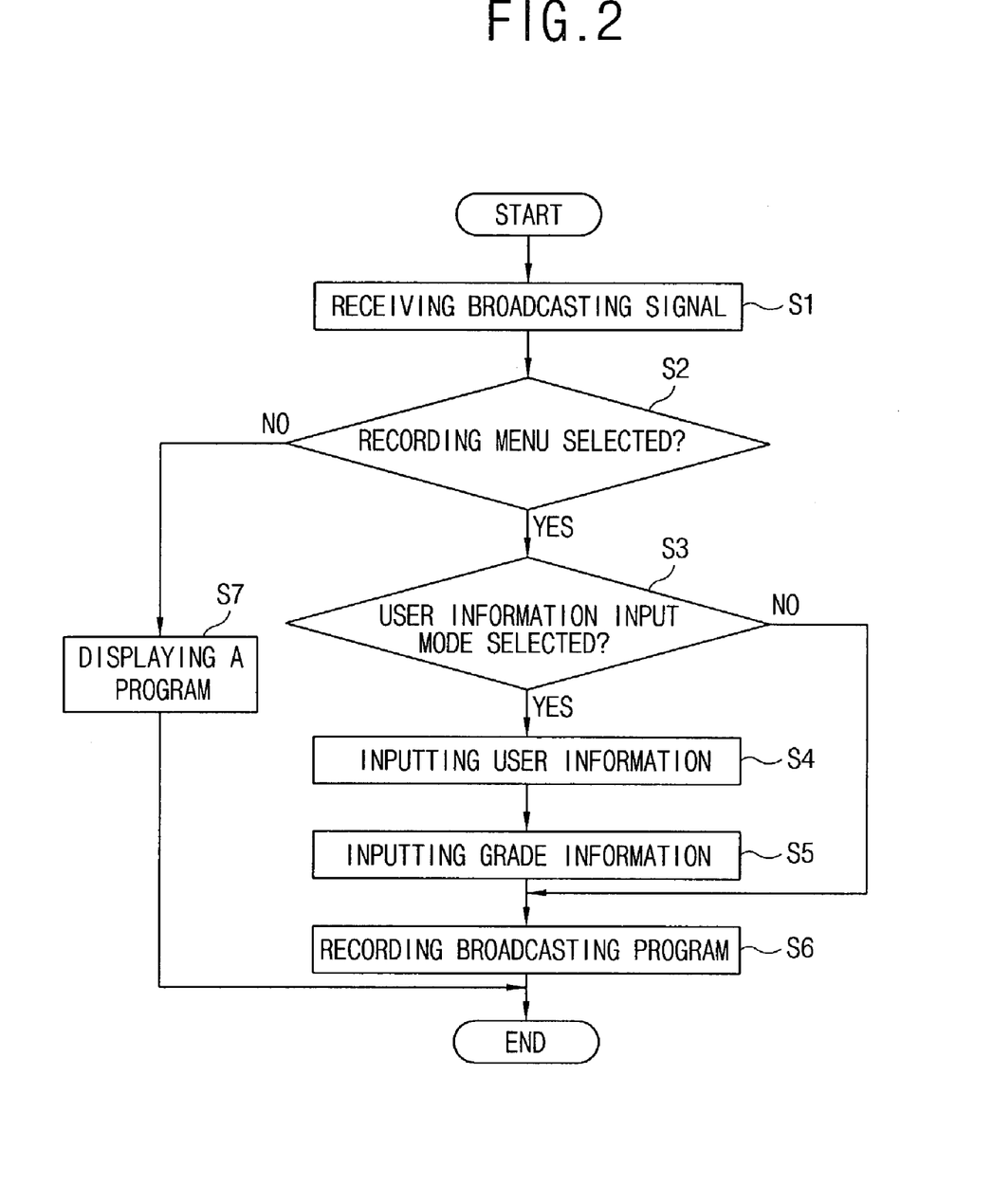
FIG. 2 is a flow chart illustrating a method for recording programs in the PVR, according to the embodiment of the present invention.

Now with reference to FIG. 2, a method of recording data on the PVR will be described. In step S1, the PVR of FIG. 1 is receiving a broadcasting signal. In step S2, a user has selected a desired program, such as by highlighting the program in an electronic programming guide, and is offered an onscreen option to select a recording menu. If the user selects the recording menu, the process proceeds to step S3, if not, the process ends. That is, the user does not wish to record the desired program, i.e. the recording menu was not selected, and other processes not relevant to the present invention will follow, e.g. the program is viewed without being recorded, the user is returned to the electronic programming guide, etc.

If the answer to step S2 is yes, the process proceeds to step S3. In step S3, the user is asked, via an onscreen prompt, if the user wishes to input their user information. The user information will uniquely identify the user to the PVR, and may include one or both of a user name and user password.

Figure 3A:
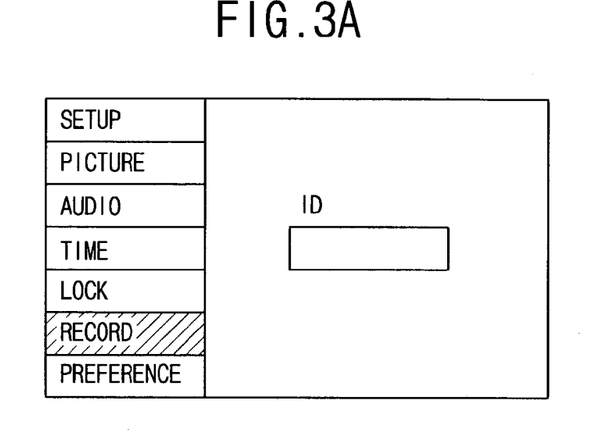
FIGS. 3A-3C are views showing display prompts for inputting user information and a protection grade, according to an embodiment of the present invention.
Figure 3B:
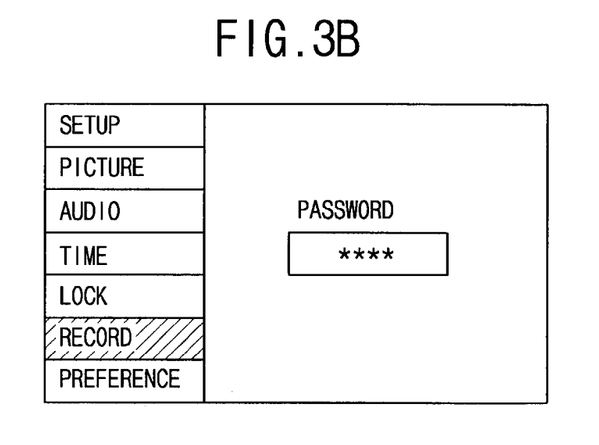
Figure 3C:
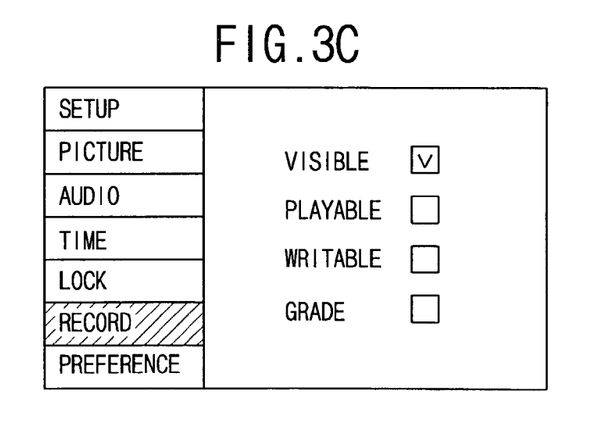

If the answer in step S3 is no, the process proceeds to step S6. In step S6, the desired program is recorded in the storing unit 17 of the PVR and a "protection grade" of the recorded program will be set to equal 1. If the answer in step S3 is yes, the process proceeds to step S4. In step S4, the user is prompted onscreen (See FIGS. 3A and 3B) to input their user information, e.g. ID or name and password. The user information may be inputted by using a keypad of a remote control associated with the PVR. Next, in step S5, the user is prompted to specify a protection grade to be associated with the desired program to be recorded. One embodiment of this onscreen prompt is illustrated in FIG. 3C. For example, the user may independently check boxes to indicate the various protections desired, or may input a number or letter associated with a certain protection grade, as summarized in Table 1, below.

Table 1 illustrates several potential protection grades, which the user may associate with the desired program to be recorded.

TABLE 1

POTENTIAL PROTECTION GRADES

| Protection Grade | Visible in Menu | Playable by Others | Write Protected (time) |
|---|---|---|---|
| 1 | yes | yes | no |
| 2 | yes | yes | yes (X) |
| 3 | yes | no | yes (X) |
| 4 | no | no | yes (X) |
| 5 | no | no | no |

Protection grade 1 represents the lowest level of protection. In other word's the program's associated information (e.g. title, genre, description) will be visible in the menu listing the programs stored in the PVR, the program may be played by other users of the PVR, and the program is not write protected, meaning that other PVR users may erase or overwrite the program, as they desire.

Protection grade 2 allows the program's associated information to be displayed in the menu listing the programs stored on the PVR, and also allows the program to be played by others. However, the protection grade 2 write protects the program. The variable (X) in Table 1 is a user settable value and represents the time duration of the write protection. For example, a user may specify one week of overwrite protection, one month, indefinite overwrite protection, etc. The time variable X would be input during the step S5, such as by using a keypad of a remote control associated with the PVR.

Protection grade 3 is similar to protection grade 2, except that the recorded program will not be playable by others. This protection level is useful, if the recorded programming includes subject matter which would not be suitable for other viewers. For example, an adult may have recorded an R rated movie and does not wish to allow the movie to be viewed by children who also use the PVR. Another example, would be an adult may have recorded an audio track of an adult-oriented comedy from a compact disc onto the PVR. Again, the adult may wish to restrict others from playing the recorded audio track. Another example, would be where an adult has recorded a text file, (e.g. insurance documents, a will) and wishes to preserve the privacy of the text document.

Protection grade 4 is similar to protection grade 3, except that the program's associated information (e.g. title, genre, description) will not be visible to others when they access in the menu listing the programs stored in the PVR. The title may be replaced with a generic listing, such as "Program 2," or more preferably the date and/or time of recording. Of course, the listing will be visible to the same user (as verified by the user name/password), when that user later accesses the recorded program listing menu. Protection level 4 could be useful to an adult who does not want a minor to even be aware of the program recorded on the PVR. For example, the title of the program may be objectionable and not for viewing by a child, and even more often the plot summary/description could be objectionable and not suitable for viewing by a child.

Protection grade 5 is similar to protection grade 4, except that the program may be overwritten by others. Protection grade 5 would be useful in the instance where an adult has recorded a program which is not suitable for viewing or playing by younger children. However, the program is not particularly entertaining to the adult, so the adult does not wish to archive the program, and would not object to the program being overwritten. This protection grade would be particularly useful when the memory of the PVR is nearly at fully capacity, and the adult does not wish to deny another user of the PVR the ability to record a program at the sake of preserving the program set at protection grade 5.

After step S5, the process proceeds to step S6. In step S6, the program is stored in the storing unit 17 of the PVR. Associated program information (title, genre, original air date, running time, plot summary, restriction rating, etc.) is stored along with the program and may be later used in association with the menu listing the program stored in the PVR. For example, a person may highlight a program from the listing and press an information button on a remote control to view the associated information.

If the method proceeded to step S6, via step S5, the user information and the protection grade are also stored along with the program. If the method proceeded to step S6, via step S3, no user information and no protection grade has been inputted, and hence the user information and protection grade are not stored along with the program in the PVR. In such an instance the protection grade could default to equal protection grade 1.

Figure 4:
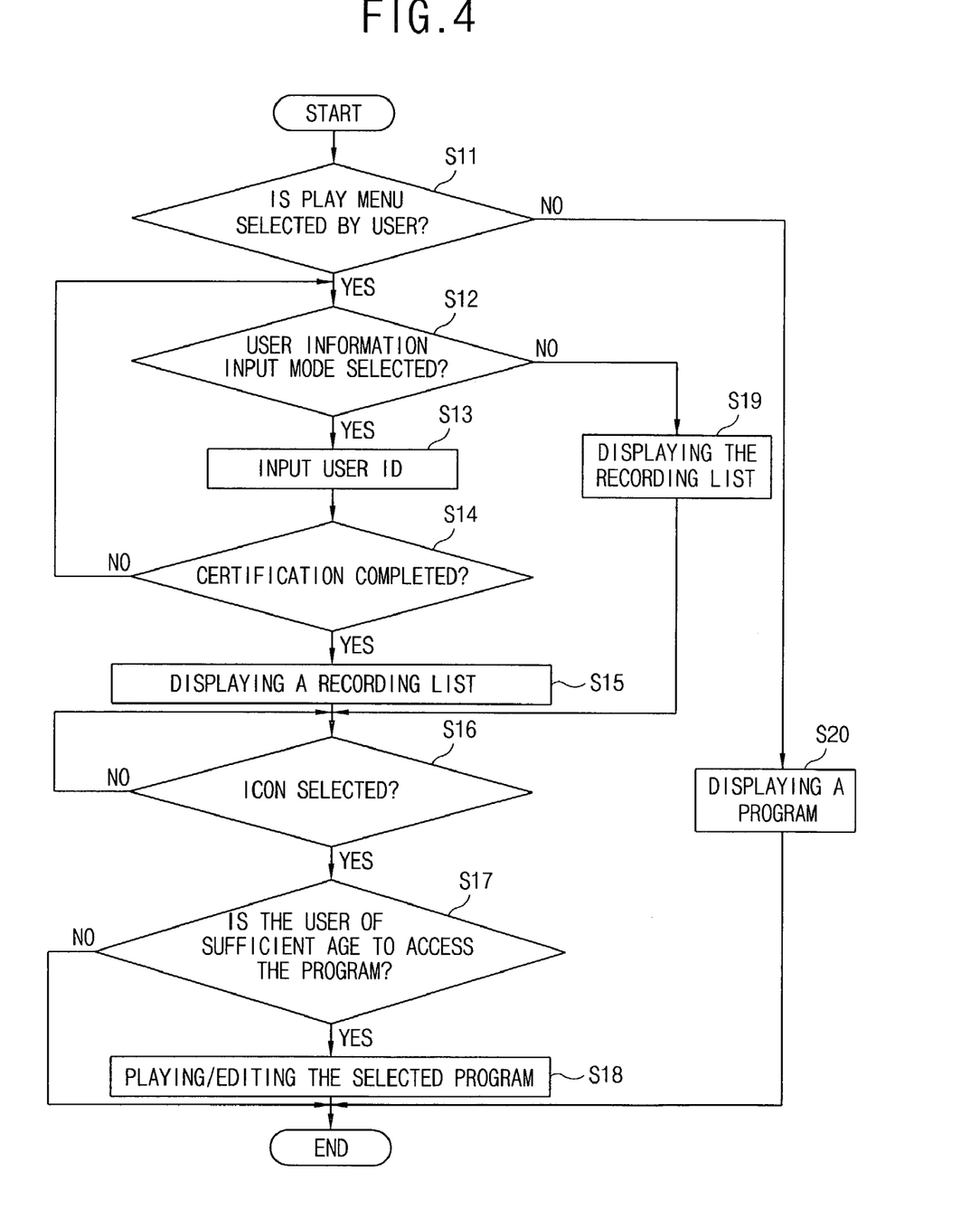
FIG. 4 is a flow chart illustrating a method for playing stored programs in the PVR, according to an embodiment of the present invention.

Hereinafter, a method for playing a program recorded on the PVR will be described with reference to the flow chart of FIG. 4. In step S11, the controlling unit 16 decides whether or not a user has selected a menu of listing of the programs stored on the PVR. The play menu may be selected by pressing a dedicated button on a remote control, or by highlighting an option in an onscreen menu. If the user has not selected the play menu, the process ends. S20 That is, other non-related functions of the PVR continue, e.g., a program displayed, an electronic program guide is displayed, etc.

If the user did select the play menu, the process proceeds to step S12. In step S12, the user is asked, via an onscreen prompt, if the user wishes to input their user information. The user information will uniquely identify the user to the PRV, and may include one or both of a user name and user password.

If the answer in step S12 is no, the process proceeds to step S19. In step S19, the menu or listing of programs stored in the PVR is displayed on the playing device 15. However, it should be noted that if the protection grade of a program specifies that the program is to be hidden, the program's title will not be displayed, or will be displayed by a generic label, e.g. "Mar. 17, 2003—Two Hours."

If the answer in step S12 is yes, the process proceeds to step S13. In step S13, the user is prompted onscreen (See FIGS. 3A and 3B) to input their user information, e.g. ID or name and password. The user information may be inputted by using a keypad of a remote control associated with the PVR.

Next, in step S14, the control unit 16 certifies the user by comparing the inputted user name/password to a stored list of user names/passwords in the storing unit 17. If a match is found, the process proceeds to step S15. If no match is found, the process returns to step S12.

In step S15, the control unit 16 causes the menu or listing of stored programs to be displayed on the playing device 15. One difference between the listing of stored programs displayed in step S15 and the listing displayed in step S19 would be that the non-visible programs associated with the certified user would be visible in the listing of step S15. Whereas, in step S19, since no user has certified themselves to the PVR, all of the non-visible stored programs would remain non-visible in the stored program listing.

Table 2 below illustrates one example of a menu or listing of programs stored on the PVR, which would be displayed on a screen of the playing device 15, in step S15. If the listing were accessed via step S15, the user name of the person accessing the PVR listing could be displayed in the upper left corner as illustrated. Of course, if the listing is access via step S19, no user name would be displayed.

TABLE 2

STORED PROGRAM LISTING

User name: Elizabeth

Recording list

| Recording time | Recorder name | Grade information | | Genre information |
|---|---|---|---|---|
| 08-15-2002 12:00 | Elizabeth | 1 | > x ? | Sports |
| 09-01-2002 02:30 | Tom | 1 | > x ? | News |
| 09-03-2002 22:15 | Tom | 3 | | Movie |
| 10-11-2002 01:00 | Tom | 2 | > | Movie |
| 10-17-2002 23:00 | Elizabeth | 2 | > x ? | Sports |
| 12-25-2002 14:00 | **** | 4 | | **** |
| 10-19-2002 01:30 | Elizabeth | 4 | > x ? | Adult |
| 01-03-2003 11:00 | **** | 5 | x | **** |

Several icons are displayed under the heading of grade information. The ">" icon represent a command to play the program. The "x" icon represents a command to erase the program. The "?" icon represent a command to change the protection grade of the program. A user may select a displayed icon in the listing by highlighting/selecting that icon using a remote control.

It should be noted that the icons displayed in association with a program are related to the program's protection level. For example, if the program has a protection level of "1," the command icons for play, erase and change protection level are present. If a program has a protection level of "2," the command icon for play is present, but the command icons for erase and change protection level are not. This scheme corresponds to the protection grades outlined in Table 1, above. In other words, Elizabeth could play, erase and/or change the protection level of Tom's recorded program of Sep. 1, 2002. Elizabeth could play, but not erase and/or change the protection level of Tom's recorded program of Oct. 11, 2002; and although Elizabeth can see that Tom recorded a program on Sep. 3, 2002, she cannot play, erase or change the protection level of that program.

If Tom set an expiration date for the overwrite protection of the programs of Sep. 3, 2002 and Oct. 11, 2002, the x icon may, or may not, appear in the listing, depending upon the date of viewing the listing. For example, if Tom set a protection grade for the Sep. 3, 2002 program of protection grade "3" and specified an "X" value of three months, the x icon would not appear in association with this program in the listing, if the listing were accessed on or before Dec. 3, 2002, but the x icon would appear in association with this program in the listing after Dec. 3, 2002.

Elizabeth can also see that programs were recorded on Dec. 25, 2002 Jan. 2, 2003, however, she cannot see who recorded them or the genre of the programs. If she highlighted or selected one of these programs in the listing, no further information would be available. This should be contrasted to the programs having a protection grade of 1, 2 or 3, where highlighting or selecting the program may bring up additional information, such as title, plot summary, restriction rating, major actors and actresses, etc.

Since Elizabeth accessed the listing via step S15 and is listed as the user in the upper left corner of Table 2, she has full access to all of her recorded programs, e.g. Elizabeth can view, play, erase, and change the protection level of her stored programs. If Elizabeth had accessed the listing via step S19 (not entered her user name and/or password), the listing of stored programs would have appeared as presented in Table 3, below. Since Elizabeth is not certified or verified by the PVR, she no longer has full access to her own recorded programs, she only has access commensurate with the respective protection levels she assigned when she recorded the programs.

TABLE 3

STORED PROGRAM LISTING

User name: not registered

| Recording time | Recorder name | Grade information | | Genre information |
|---|---|---|---|---|
| 08-15-2002 12:00 | Elizabeth | 1 | > x ? | Sports |
| 09-01-2002 02:30 | Tom | 1 | > x ? | News |
| 09-03-2002 22:15 | Tom | 3 | | Movie |
| 10-11-2002 01:00 | Tom | 2 | > | Movie |
| 10-17-2002 23:00 | Elizabeth | 2 | > | Sports |
| 12-25-2002 14:00 | **** | 4 | | **** |
| 10-19-2002 01:30 | **** | 4 | | **** |
| 01-03-2003 11:00 | **** | 5 | x | **** |

It is envisioned that a master user ID (user name and/or password) could also be recognized by the PVR in step S14. The master user ID could be initially set by the owner of the PVR, e.g., a parent. If the master user ID is verified in step S14, the listing would shows all titles of the stored programs and provide full access to the parent to manage and oversee the PVR's usage. Table 4 illustrates the listing when the PVR verifies the master as the user's ID.

TABLE 4

STORED PROGRAM LISTING

User name: Master

Recording list

| Recording time | Recorder name | Grade information | | Genre information |
|---|---|---|---|---|
| 08-15-2002 12:00 | Elizabeth | 1 | > x ? | Sports |
| 09-01-2002 02:30 | Tom | 1 | > x ? | News |
| 09-03-2002 22:15 | Tom | 3 | > x ? | Movie |
| 10-11-2002 01:00 | Tom | 2 | > x ? | Movie |
| 10-17-2002 23:00 | Elizabeth | 2 | > x ? | Sports |
| 12-25-2002 14:00 | Jack | 4 | > x ? | Adult |
| 10-19-2002 01:30 | Elizabeth | 4 | > x ? | Adult |
| 01-03-2003 11:00 | Tom | 5 | > x ? | Movie |

After the listing is displayed in either of steps S15 or S19, the process proceeds to step S16. In step S16, the PVR waits for the user to select one of the displayed icons. Once an icon is selected, the process proceeds to step S17. Of course, the user could escape the listing, by pressing a cancel or escape key on the remote, or highlighting a cancel or escape option on the displayed listing. Such an escape would act as an interrupt to the control unit 16 to return the process to step S11.

In step S17, the PVR checks the restriction rating of the program associated with the selected command. If the selected icon corresponds to playing or changing the protection grade of a program, the PVR must verify that the user is of sufficient age to issue such a command.

If the user is certified from step S14, the PVR will access data, pre-stored in the storing unit 17 associated with that user. The data could have been initially stored in the storing unit 17 by the person having the master ID for the PVR. The data will represent a view restriction for the various users of the PVR. For example, John can potentially view (and hence change the protection grade of) programs having a PG-13 or lower restriction rating; Jill can potentially view (and hence change the protection grade of) programs having an R or lower restriction rating. If the user accessed the listing via step S19 and is hence not known to the PVR, the PVR will prompt the user to enter their user ID, via FIGS. 3A and 3B, prior to performing step S17.

Of course, if the selected icon is associated with a program having a G rating step S17 could be skipped. Further, this threshold could be set by the master of the PVR. For example, viewing of programs at or below a PG-13 rating may be set to not require verification of a user or the user's age by the PVR. After step S17, the program may be viewed on the display device 17 in step S18.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of operating a personal video recorder (PVR) comprising:
   selecting a desired program to record;
   inputting user identification information;
   setting a protection grade for the desired program; and
   recording the desired program in a memory, and saving identification information associated with the saved program along with the user identification information and protection grade in a recording list,
   wherein the protection grade specifies whether or not the stored program has any level of overwrite protection,
   wherein each program in the recording list is listed with one of different protection levels based upon the protection grade associated with the recorded program, and
   wherein one of the different protection levels causes a recorded program to be listed without displaying a user's name that recorded the program.

2. The method of claim 1, wherein the identification information associated with the saved program includes at least one of a title, a program duration, a restriction rating, a genre, an original air date and a plot summary.

3. The method of claim 1, wherein the protection grade includes a preservation duration, which specifies how long the stored program will be write-protected in the memory.

4. The method of claim 1, wherein the protection grade includes a setting to determine whether or not the identification information will be displayed in the recording list.

5. The method of claim 1, wherein the protection grade further specifies whether or not the stored program will be playable by other users of the PVR, and whether or not a title of the stored program will be displayed in the recording list.

6. The method of claim 1, wherein the protection grade includes a setting to determine whether or not the stored program will be playable by other users of the PVR.

7. The method of claim 1, wherein the protection grade includes a setting to determine whether or not the stored program will be write protected to control whether or not other users of the PVR will be able to overwrite the stored program.

8. The method of claim 1, wherein said step of inputting the user identification includes inputting a user name and password.

9. The method of claim 1, wherein the memory is physically located in the PVR.

10. The method of claim 1, wherein said selecting step includes highlighting the desired program in an electronic program guide using a remote control.

11. A method of operating a personal video recorder (PVR) comprising:
    receiving a request to view a listing of recorded programs;
    retrieving a listing of programs recorded on the PVR; and
    displaying the listing of programs,
    wherein each program in the listing is listed with one of different protection levels based upon a protection grade associated with the recorded program, and
    wherein one of the different protection levels causes a recorded program to be listed without displaying a user's name that recorded the program.

12. The method of claim 11, wherein the protection grade is set by the user who recorded the program on the PVR.

13. The method of claim 11, wherein one of the different protection levels causes a recorded program to be listed without it title, genre and/or plot summary.

14. The method of claim 11, wherein the different protection levels are indicated by one or more command icons associated with a recorded program in the listing of recorded programs.

15. A method of operating a personal video recorder (PVR) comprising:
    receiving a request to view a listing of recorded programs;
    retrieving a listing of programs recorded on the PVR; and
    displaying the listing of programs,
    wherein each program in the listing is listed with one of different protection levels based upon a protection grade associated with the recorded program,
    wherein the different protection levels are indicated by one or more command icons associated with a recorded program in the listing of recorded programs,
    wherein whether or not a command icon is displayed in combination with the recorded program is dependent upon the protection grade of the recorded program, and
    wherein one of the different protection levels causes a recoded program to be listed without displaying a user's name that recorded the program.

16. The method of claim 14, wherein the command icons include the functions of play and erase, dependent upon the protection grade.

17. The method of claim 16, wherein if a first protection grade is associated with the recorded program, the command icon of that program will show a play command to permit playing of the program.

18. The method of claim 17, wherein if a second protection grade is associated with the recorded program, the command icons of that program will show both a play command and an erase command to permit either playing or erasing of the program.

19. The method of claim 16, wherein the command icons in the listing of recorded programs also includes a command for changing a protection grade.

20. The method of claim 19, wherein selecting the change protection grade command associated with a particular recorded program will cause the PVR to prompt the user to input a user ID, and upon verifying the status level of the user, the PVR will allow the user to change the protection grade of the recorded program.

21. The method of claim 20, wherein the user must be verified by the PVR to be the same user that originally recorded the program, or a master user, before the PVR will allow the protection grade of a recorded program to be changed.

22. The method of claim 16, wherein selecting the play command associated with a recorded program will cause the PVR to prompt the user to input a user ID, and upon verifying the status level of the user, the PVR will allow the user to play the recorded program.

23. The method of claim 22, wherein the user must be verified by the PVR to be a user of suitable age to view the recorded program, based upon a restriction rating of the program, before the PVR will allow the recorded program to be played.

24. A method of organizing a listing of recorded programs on a personal video recorder (PVR) comprising:
    receiving a request to view a listing of recorded programs;
    receiving a user ID;
    retrieving a listing of recorded programs associated with the user ID; and
    displaying the listing of recorded programs associated with the user ID on a display connected to the PVR, wherein each program in the listing is listed with one of different protection levels based upon a protection grade associated with the recorded program, and wherein one of the different protection levels causes a recoded program to be listed without displaying a user's name that recorded the program.

25. The method of claim 24, wherein said steps of receiving the request and receiving a user ID are accomplished via a remote control receiver input of the PVR.

26. The method of claim 24, wherein if the user ID is a master user's ID, which is preset in the PVR, all of the programs recorded on the PVR a reviewable on the listing of recorded programs and accessible via the PVR.

27. The method of claim 24, wherein said step of receiving the user ID includes receiving a user name and password.

28. A personal video recorder (PVR) for recording programs comprising:

an input section receiving user's selection of a desired program to record and a user's ID and a user's selected protection grade for the desired program;

a control unit associating the user's ID and protection grade with the desired program; and a memory connected to said control unit to store the desired program, and to store identification information associated with the saved program along with the user ID and protection grade in a recording list, wherein the protection grade specifies whether or not the stored program has any level of overwrite protections, wherein each program in the recording list is listed with one of different protection levels based upon the protection grade associated with the recorded program, and wherein one of the different protection levels causes a recorded program to be listed without displaying a user's name that recorded the program.

29. The PVR of claim 28, wherein the identification information associated with the stored program includes at least one of a title, a program duration, a restriction rating, a genre, an original air date and a plot summary.

30. The PVR of claim 28, wherein the protection grade includes a preservation duration, which specifies how long the stored program will be write-protected in the memory.

31. The PVR of claim 28, wherein the protection grade includes a setting to determine whether or not the identification information will be displayed in the recording list.

32. The PVR of claim 28, wherein the protection grade further specifies whether or not the stored program will be playable by other users of said PVR, and whether or not a title of the stored program will be displayed in the recording list.

33. The PVR of claim 28, wherein the protection grade includes a setting to determine whether or not the stored program will be playable by other users of said PVR.

34. The PVR of claim 28, wherein the protection grade includes a setting to determine whether or not the stored program will be write protected to control whether or not other users of said PVR will be able to overwrite the stored program.

35. The PVR of claim 28, wherein the user ID includes a user name and password.

36. The PVR of claim 28, wherein said memory is physically located in said PVR.

37. The PVR of claim 28, wherein said input section can also receive a user's request to view a listing of recorded programs, wherein said PVR further includes an output section for outputting a listing of programs recorded on said PVR, and wherein each program in the listing is listed with one of different protection levels based upon the protection grade associated with the recorded program.

38. The PVR of claim 37, wherein the different protection grades are indicated by command icons associated with recorded programs in the listing of recorded programs.

39. The PVR of claim 38, wherein the command icons include the functions of play and erase, dependent upon the protection grade.

40. The PVR of claim 39, wherein if a first protection grade is associated with the recorded program, the command icon of that program will show a play command to permit playing of the program.

41. The PVR of claim 40, wherein if a second protection grade is associated with the recorded program, the command icons of that program will show both a play command and an erase command to permit either playing or erasing of the program.

42. The PVR of claim 39, wherein the command icons in the listing of recorded programs also include a command for changing a protection grade.

43. A method of operating a personal video recorder (PVR), comprising:

setting a protection grade for a desired program; and recording the desired program in a memory, and saving identification information associated with the saved program along with user identification information and protection grade in a recording list, wherein each program in the recording list is listed with one of different protection levels based upon the protection grade associated with the recorded program, and wherein one of the different protection levels causes a recoded program to be listed without displaying a user's name that recorded the program.

* * * * *